Sept. 9, 1941.   J. H. WARING   2,255,140
BURNISHING TOOL
Filed May 31, 1940
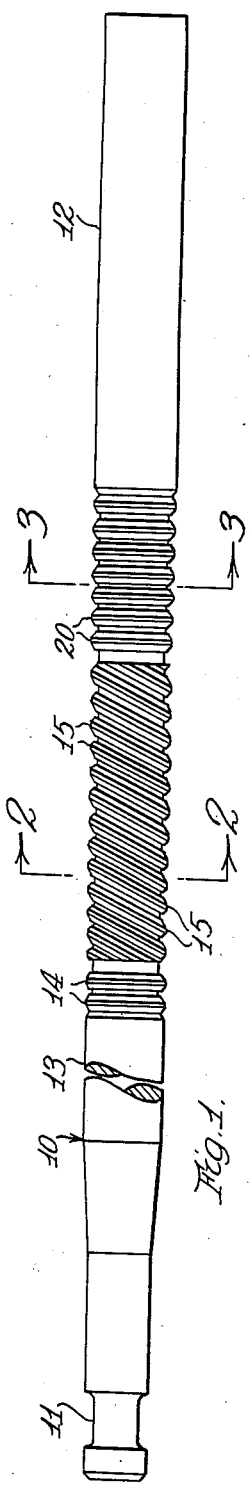
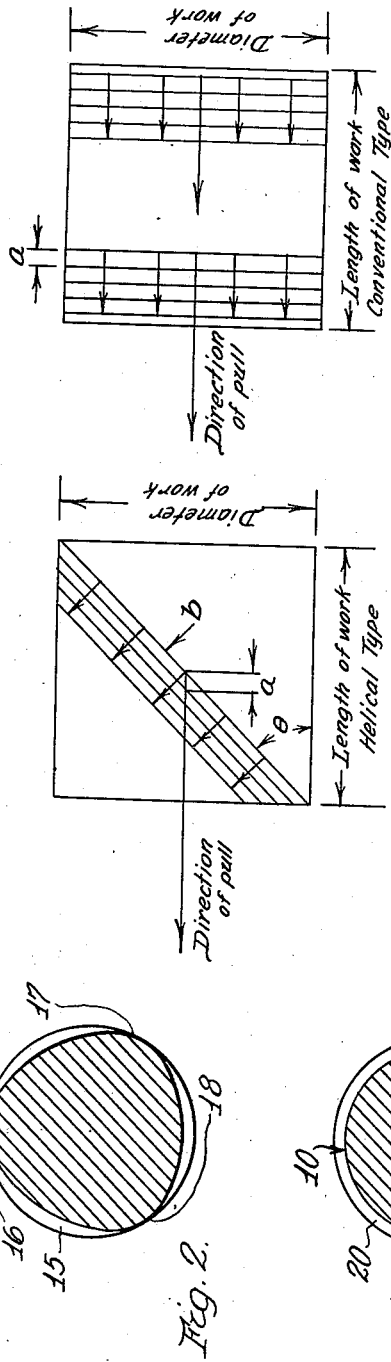
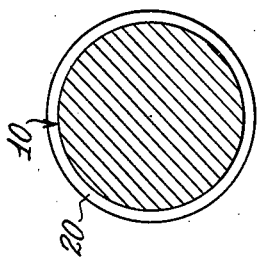
INVENTOR.
James H. Waring
BY John F. Stark
ATTORNEY.

Patented Sept. 9, 1941

2,255,140

UNITED STATES PATENT OFFICE 2,255,140

BURNISHING TOOL

James H. Waring, Brunswick, Ohio, assignor to Eaton Manufacturing Company, Cleveland, Ohio, a corporation of Ohio Application May 31, 1940, Serial No. 338,141

7 Claims. (Cl. 29—90)

This invention relates to burnishing tools in general but more particularly concerns a tool for producing a burnished hole in an article having a relatively smooth cylindrical bore.

The primary object of this invention is the provision of a burnishing tool which has a continuous burnishing action incorporated upon a section of tapered diameter, as distinguished from a conventional burnishing tool having interrupted annular burnishing rings or buttons; the provision of a tapered burnishing tool having a continuous burnishing action as above described in which the tapered burnishing section thereof is in the form of one or more, preferably three, helixes which may be arranged in an unequal or staggered axial spacing; the provision in a burnishing tool as above described of axially spaced annular rings or buttons on either side of a tapered helical burnishing section for removing burrs or slight irregularities before initiating the burnishing operation and maintaining the finished size of the burnished hole subsequent to the burnishing operation.

Further and other objects and advantages of this invention reside in the novel combination and arrangement of parts to be hereinafter described and pointed out with particularity in the appended claims.

In the drawing like reference characters denote corresponding parts throughout the several views, and in which:

Fig. 1 is an elevational view, broken in longitudinal length, illustrating a preferred form of burnishing tool of this invention; and Fig. 2 is a vertical diametrical sectional view through the tapered helical portion of the burnishing tool of Fig. 1 substantially on the line 2—2 thereof; and Fig. 3 is a similar vertical sectional view substantially on the line 3—3 of Fig. 1; and Fig. 4 is a diagrammatic showing of the action of a burnishing tool according to this invention; and Fig. 5 is a similar diagrammatic illustration of a conventional type burnishing tool showing the direction of displacement of the metal acted upon.

Now having reference to the drawing and particularly Figs. 1-3 there is shown a burnishing tool, generally designated 10, designed to act upon a circular hole to produce a smooth polished cylindrical bore. The burnishing tool 10 is generally of circular section and constitutes a solid cylinder in longitudinal length having a reduced forward end notched as at 11 to be engaged by a suitable puller (not shown) in accomplishing the burnishing operation through the bore of a work piece. The opposite rear end 12 of the burnishing tool is journalled or supported in any suitable manner which permits longitudinal sliding movement upon initiating the burnishing operation by means of the aforesaid puller. The work piece to be operated upon or burnished is threaded over the reduced forward and notched end 11, the tapered section therebeyond, and upon the smooth circular section 13 which has an outer perimeter dimensioned so as to present a sliding fit to the bore of the piece to be burnished.

Adjacent the circular section 13, where the work to be burnished is initially positioned, are a pair of raised annular buttons 14 integral with the tool 10, disposed normally to the longitudinal axis thereof and presenting an outer periphery approximately one and one-half thousandths (.0015) of an inch greater than the preceding section 13, whereby any burrs or slight irregularities in the bore of the work piece produced by a preceding operation, will be removed.

Axially spaced a short distance beyond the section having the annular buttons 14 is the burnishing section of this tool forming the principal part of the present invention. Upon this section of the tool are formed one or more series of spiral or helically disposed integral raised sections generally designated 15, and as in the present instance the tool is composed of three helixes 16, 17 and 18. The helixes 16, 17 and 18, comprising the spiral sections 15, have a triple spiral and are arranged to start approximately 120° apart around the periphery of the tool, as best shown in Fig. 2, and are further staggered with respect to the longitudinal length of the tool so as to present unequal axial spacing, as best shown in Fig. 1. For example, it has been found that with a 120° angular spacing between the first spiral and second spiral there is a one-half inch (½") axial spacing between the adjacent convolutions; while a 113° angular spacing between this second spiral and the third spiral provides a $\frac{15}{32}$" axial spacing between the adjacent convolutions; and the remaining 127° angular spacing between the third and first spirals provides a $\frac{17}{32}$" axial spacing, thereby totaling 360° around the periphery of the tool and the summation of the unequal axial spacings results in a thread lead of one and one-half inch (1½"). Accordingly, it will be seen there are provided triple spirals, which do not interfere with each other and, which also has a stagger in the axial length thereof so as to provide unequal spacing between the three helixes. A staggered multiple helical section such as just described has a taper of approximately .0025 inch in a length of six inches, and it will be apparent that a continuous burnishing action is effected on the work piece operated upon by reason of the angular relation or pitch of the burnishing section to the work, rather than the conventional interrupted annular burnishing rings disposed in normal relation to the work piece; the value of which will be hereinafter further enumerated.

Following the multiple series of staggered helical sections 15 are a final series of raised annular buttons 20 integral with and disposed normally to the longitudinal axis of the tool 10. These buttons 20 are staggered axially an unequal distance apart for the purpose of maintaining the finished size of the bore in the work piece as effected by the preceding helical sections 15, consequently, the outer periphery of these buttons 20 are uniformly dimensioned to correspond to the maximum perimeter of the proceeding tapered section. The burnishing tool may be formed from a piece of tool steel, hardened, chrome plated, and ground and lapped to size. The burnishing buttons are highly polished in order to insure a like finish being imparted to the work piece operated upon.

To completely illustrate the meritorious features of this invention, as distinguished from a conventional burnishing tool reference may be had to Figs. 4 and 5. In these diagrammatic illustrations an elevation of a portion of the bore of a work piece has reference markings thereon indicating the length and diameter of the work and the direction of movement of the burnishing tool thereover, the showing in Fig. 4 being descriptive of the action effected by the burnishing tool of this invention while Fig. 5 refers to a conventional burnishing tool, as indicated. For convenience of illustration, and since the principle is adequately represented thereby, only a single helix is shown in Fig. 4. When the tool is moved in the direction of pull shown, the helical disposition of the burnishing sections causes displacement of metal from the bore wall of the work piece at right angles to the pitch of the helix, or as shown by the direction of the arrows. This displacement of metal, which really amounts to rolling over the high points of the bore wall, rolls the same spirally ahead of it in an even and uninterrupted manner. It will also be apparent now that increasing the number of helixes multiplies the evenness which is rolled into the wall by decreasing the spacing between the leads of the threads of the helixes. The exact amount an increment of metal of the work piece is moved when the burnishing tool is moved a distance "$a$," and "$\theta$" represents the pitch angle of the helix with respect to the axial length of the work, is shown by the letter "$b$." This distance varies with angle $\theta$ and $$b = a \sin \theta$$

The representation in Fig. 5 illustrates the action of a conventional burnishing tool in which the two vertical groups of lines with arrows thereacross designates a pair of axially spaced annular rings or buttons. The length and diameter of a portion of the elevation of the bore wall of the work piece, including the direction of movement of pull of the tool, have been described by suitable reference markings. As the burnishing tool is moved forward longitudinally of the work piece in the direction shown by the arrow, the displacement of metal on the bore wall of the work piece is shown by the multiple series of lateral arrows. For a given movement represented by the distance "$a$" metal is displaced a like amount, whereas, in Fig. 4 the distance is only "$b$," thus producing a smoother action and resulting in a better finish than produced by the conventional burnishing tool with annular rings or buttons.

From the foregoing disclosures it will now be apparent there has been described a new and novel burnishing tool accomplishing among other things the objects and advantages of this invention as first enumerated, and while only one specific embodiment of the invention has been described it is not intended to be limited to the precise details thereof, which is merely for the purpose of illustration, since many variations will present themselves in actual practice, but consider this invention as comprehending all formal modifications and mechanical equivalents fairly within the spirit and scope of the invention as defined by the scope of the following claims.

What I claim is:

1. A burnishing tool comprising a body having a circular section and elongated in length, said tool having adjacent the forward end thereof one or more raised annular burnishing rings disposed normal to its longitudinal axis, an intermediate series of normal helically disposed burnishing sections adapted to produce a continuous burnishing action, and a final group of raised annular burnishing rings disposed normal to the longitudinal axis of the tool.

2. A burnishing tool comprising a body having a circular section and elongated in length, said tool having adjacent the forward end thereof one or more raised annular burnishing rings disposed normal to its longitudinal axis, an intermediate multiple series of normal helically disposed burnishing sections adapted to produce a continuous burnishing action, and a final group of unequally axially spaced raised annular burnishing rings disposed normal to the longitudinal axis of the tool.

3. A burnishing tool comprising a body having a circular section and elongated in length, said tool having adjacent the forward end thereof one or more raised annular burnishing rings disposed normal to its longitudinal axis, an intermediate multiple series of normal helically disposed burnishing sections having the lead of the thread of each helix circumferentially spaced with respect to the others and unequally axially spaced in longitudinal length and adapted to produce a continuous burnishing action, and a final group of unequally axially spaced and raised annular burnishing rings disposed normal to the longitudinal axis of the tool.

4. A burnishing tool comprising a body having a circular section and elongated in length, said tool having adjacent the forward end thereof one or more raised annular burnishing rings or buttons disposed normal to its longitudinal axis, an intermediate multiple series of progressively tapering normal helically disposed burnishing sections having the lead of the thread of each helix circumferentially spaced with respect to the others and unequally axially spaced in longitudinal length and adapted to produce a continuous burnishing action, and a final group of unequally axially spaced raised annular burnishing rings or buttons disposed normal to the longitudinal axis of the tool.

5. A burnishing tool comprising a body of circular section and elongated length having a reduced forward end adapted to be engaged by a powered reciprocation mechanism and rear section arranged for reception in a sliding journal, said tool having intermediate the ends thereof an initial pair of axially spaced raised annular burnishing rings integral with and disposed normal to its longitudinal axis, an intermediate multiple series of unequally axially spaced and tapered helically disposed raised burnishing sections, and a final series of axially interrupted raised annular burnishing rings integral with the tool and disposed normal to its longitudinal axis proximate to the rear section thereof.

6. A burnishing tool comprising a body of circular section and elongated length having a reduced forward end adapted to be engaged by a powered reciprocating mechanism and a rear section arranged for reception in a sliding journal, said tool having intermediate the ends thereof a pair of axially spaced raised annular burnishing rings integral with and disposed normal to the tool body for initially removing high spots in the bore wall of a work piece operated upon, an intermediate multiple series of unequally axially spaced and tapered helically disposed raised burnishing sections for producing a continuous burnishing action upon said work piece subsequent to said initial operation, and a final series of axially interrupted raised annular burnishing rings integral with the tool and disposed normal to its axis proximate to the rear end thereof for sizing and maintaining the bore of the finished work piece after completion of the said continuous burnishing action.

7. A burnishing tool comprising an elongated body, a multiple helical series of burnishing sections on said body having interrupted and unequally axially spaced leads, said sections varying progressively in diameter, and a series of annular burnishing rings disposed normal to the tool body axially spaced on either side of the helical section.

JAMES H. WARING.